United States Patent
Capps

(10) Patent No.: US 9,753,558 B2
(45) Date of Patent: Sep. 5, 2017

(54) POINTING SYSTEM AND METHOD

(75) Inventor: Marshall Charles Capps, Farmers Branch, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 696 days.

(21) Appl. No.: 12/692,588

(22) Filed: Jan. 22, 2010

(65) Prior Publication Data

US 2010/0188333 A1 Jul. 29, 2010

Related U.S. Application Data

(60) Provisional application No. 61/146,642, filed on Jan. 22, 2009.

(51) Int. Cl.
*G06F 3/038* (2013.01)
*G06F 3/0354* (2013.01)

(52) U.S. Cl.
CPC .......... *G06F 3/0386* (2013.01); *G06F 3/0354* (2013.01); *G06F 3/0383* (2013.01); *G06F 3/03542* (2013.01)

(58) Field of Classification Search
CPC .. G06F 3/0383; G06F 3/0386; G06F 3/03542; G06F 3/0354
USPC .................. 345/156–166, 204, 207
See application file for complete search history.

(56) References Cited

U.S. PATENT DOCUMENTS

| | | | |
|---|---|---|---|
| 6,774,916 B2 * | 8/2004 | Pettitt et al. | 345/691 |
| 7,001,023 B2 | 2/2006 | Lee et al. | |
| 7,421,111 B2 | 9/2008 | Dietz et al. | |
| 2005/0099405 A1 * | 5/2005 | Dietz et al. | 345/179 |
| 2009/0134332 A1 | 5/2009 | Thompson et al. | |

* cited by examiner

*Primary Examiner* — William Boddie
*Assistant Examiner* — Saifeldin Elnafia
(74) *Attorney, Agent, or Firm* — Michael A. Davis, Jr.; Charles A. Brill; Frank D. Cimino

(57) ABSTRACT

A pointing device, display system, and method of operation to allow the detection of a point on an image plane at which the pointing device is pointing.

5 Claims, 10 Drawing Sheets

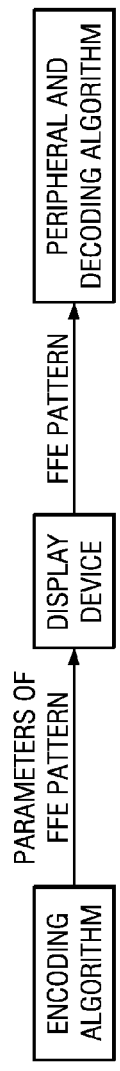
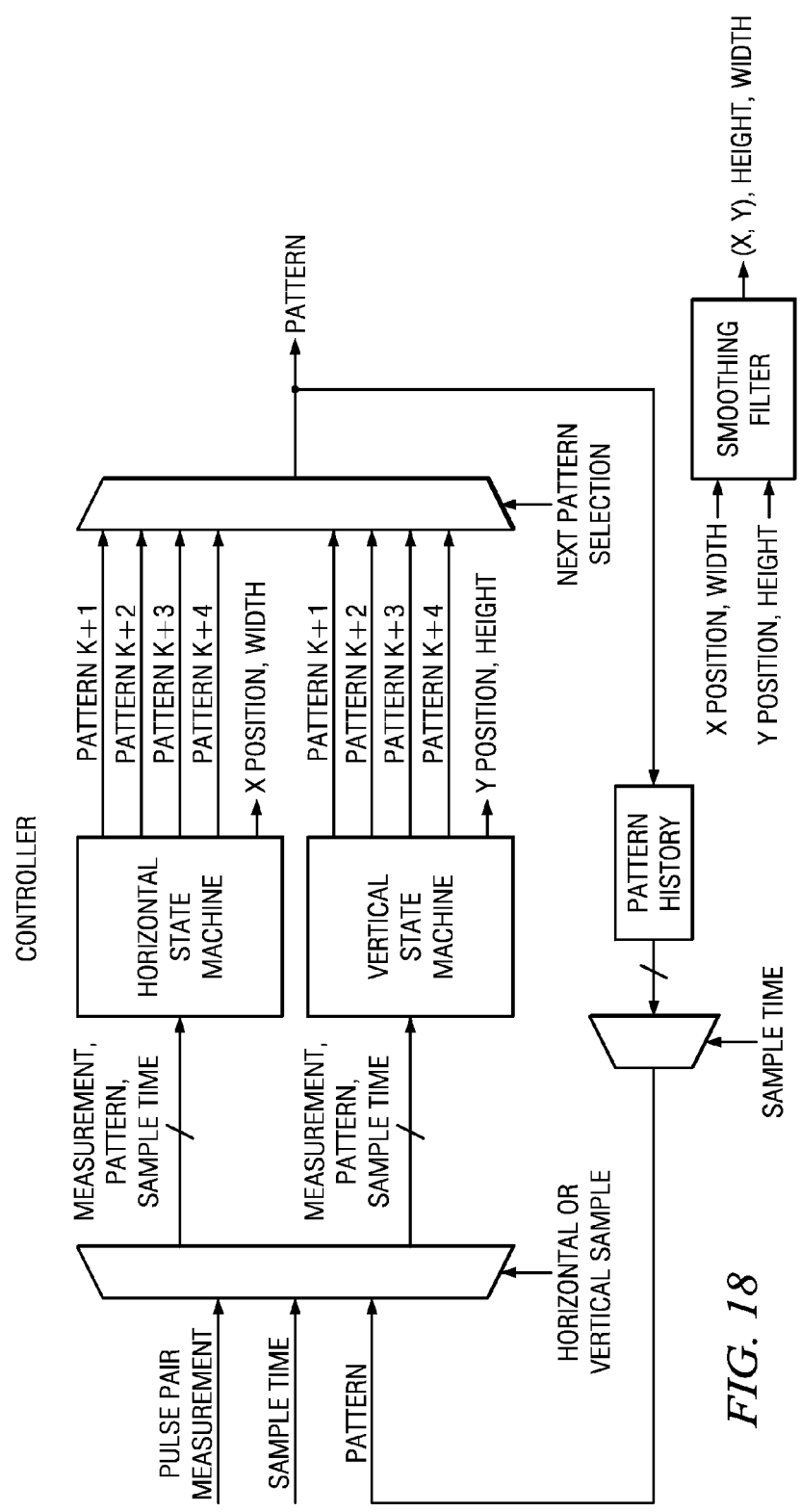

POINTING SYSTEM AND METHOD

This application claims the benefit of Provisional Application No. 61/146,642, filed 22 Jan. 2009. The contents of Provisional Application No. 61/146,642 are incorporated herein by reference.

FIELD OF THE INVENTION

The present invention relates generally to the field of image display, and more particularly to indicating locations in a displayed image, as well as to peripherals for indicating locations in a displayed image or controlling display devices and associated equipment.

BACKGROUND

There are many situations in which a user desires to indicate a location or series of locations on a displayed image, or to indicate a particular object in the displayed image. For example, a user may wish to temporarily direct the attention of an audience to a particular portion of an image as when using a pointer or laser pointer. At other times, a user may wish to annotate an image by selecting portions of the image, drawing on the image, or highlighting portions of the displayed text. Alternatively, the user may wish to control either the display device or another piece of equipment such as a satellite receiver, computer, or media player through an on screen display menu. Additionally, many computer games, especially first person shooter games, require the user to indicate certain areas of the displayed image in order to aim weapons or trigger various actions.

A variety of input devices have been developed to enable users to control equipment and displays. These devices include computer mice, pen tablets, inertial input devices such as gyroscopic mice, light pens or guns, optical remote controls, laser pointer and detectors, and other devices. While many of these devices work well in some situations and in certain environments, there is a long felt need for an improved input device that enables a user to accurately indicate a point or region of a display from a distance.

SUMMARY

One embodiment of the present invention provides a method of locating a point in an image. The method comprises: displaying a pair of substantially flat field images; receiving information representing the perceived intensity of the pair of substantially flat fields; calculating a position of a field of view relative to the substantially flat field images; and repeating the displaying, receiving, and calculating steps to determine the position of the field of view.

Another embodiment of the present invention provides a method of detecting image fields. The method comprises: synchronizing a receiver circuit to a display system; detecting the energy received by the receiver circuit during a first field; detecting the energy received by the receiver circuit during a second field; and transmitting information regarding the energy received during the first and second fields.

BRIEF DESCRIPTION OF THE DRAWINGS

FIG. 17 is a block diagram illustrating one method of controlling peripherals according to the present invention.

FIG. 18 is a block diagram of one embodiment of a controller circuit according to the present invention.

DETAILED DESCRIPTION

The present invention delivers such an input device and enables users to accurately indicate portions or points of a displayed image, control a display device or other electronic equipment, and provide inputs for various software programs. The present invention enables the foregoing while avoiding many of the image artifacts created by prior art systems and without demanding an inordinate amount of processor bandwidth.

Figure 1:
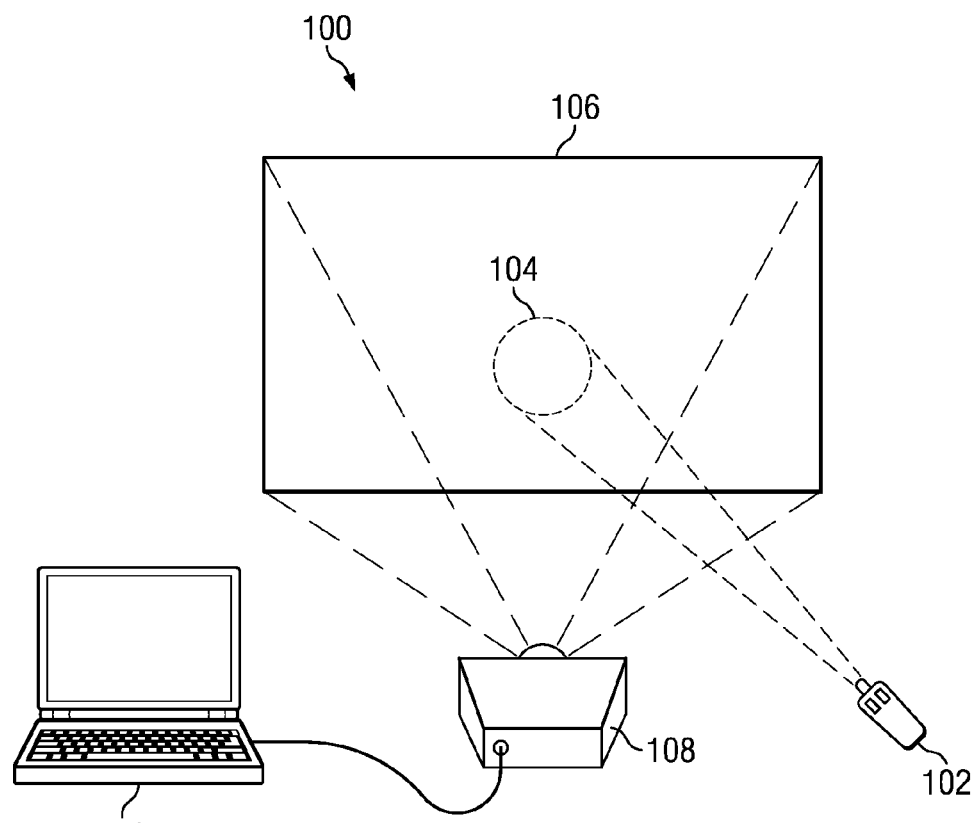
FIG. 1 is a schematic view of one embodiment of the present invention which utilizes flat field encoding to provide reference images that enable a system to determine the region indicated by an optical device

FIG. 1 is a schematic view of one embodiment of the present invention which utilizes flat field encoding to provide reference images that enable a system 100 to determine the region indicated by an optical device. In FIG. 1, a pointing device 102 is directed toward a portion 104 of an image 106 created by a display device such as projector 108 driven by computer 110.

While the system shown in FIG. 1 includes a separate image source, such as computer 110, the image source could be integrated into one or more of the other components of the system. For example, the projector could generate the image data to create the displayed image, or generate part of the image, such as an on screen display menu, and overlay the projector-created image on an image received from another device.

Likewise, the front projection system—in which the projector and user are both located on the same side of the image plane—shown in FIG. 1 is for purposes of illustration only. Other embodiments of the invention provide rear projection systems. Additionally, embodiments of the present invention include direct-view display systems such as liquid crystal displays, light emitting diode (LED) displays, or any other type of display.

One aspect of the current invention is the ability to encode information in a data stream. More specifically, the ability to encode control information in image stream. In display applications this is done through the use of flat field encoding. Flat field encoding uses pairs of fields or images whose sum contains no data. In other words, the sum of the pairs of fields has a uniform intensity and color. While two fields or images are typically used to create a flat field pair more than two fields or images may be used to create a flat field. It will be understood that the term "flat field pair" includes two or more fields.

In order to generate two fields that sum to a uniform intensity and color using a display system that receives and modulates a light beam, the fields should be generated during a period in which the illumination has both a constant intensity and a constant color.

According to one embodiment of the present invention the data encoded in the video stream is used by a pointer device to determine where the pointer is pointing. Other embodiments of the present invention include data in the video stream or other information stream in such a way to prevent a human from detecting or noticing the data. These embodiments may be used to communicate data at a low data rate without interrupting an image stream or to provide watermarking or other protection to the image stream.

Flat fields may consist of pairs of image fields, each image field comprised of two regions. One region of each field has a uniform pixel value of a first intensity, while the other region of each field has a uniform pixel value of a second intensity. Taken together, these two fields are perceived as a single field having a uniform pixel value of intensity equal to the sum of the first and second intensities. In a typical application, the first intensity is zero and the second intensity is the minimum displayable value. This allows the sum of the two flat fields to have a minimal impact on the desired image being displayed.

Figure 2A:
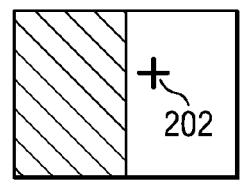
FIGS. 2A through 2L are various illustrations of display fields that together comprise a series of flat fields.
Figure 2B:
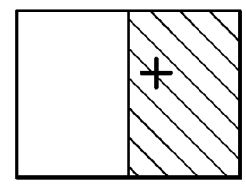

FIGS. 2A and 2B illustrate a flat field pair. In FIG. 2A the field is divided into two equal regions which abut in a vertical line down the center of the field. The left half of the field shown in FIG. 2A is crosshatched to indicate a zero intensity value. The right half of the field shown in FIG. 2A is not crosshatched which indicates a non-zero intensity value. FIG. 2B is the counterpart field for the field shown in FIG. 2A. In FIG. 2B the left half of the field is crosshatched to indicate a zero intensity value, while the left half of the field is not crosshatched to indicate a non-zero intensity value. For simplicity, the zero value region may be considered "off" and the non-zero value region may be considered "on." Likewise, regardless of the intensity, two unique intensity values may be referred to as "on" and "off."

If the two fields shown in FIGS. 2A and 2B are displayed in rapid succession in a short period, a human viewer will perceive a single field of minimal intensity. As the perceived field contains no data, or is "flat," the flat field pair will have no effect other than a slight decrease in the perceived image contrast.

Figure 3:
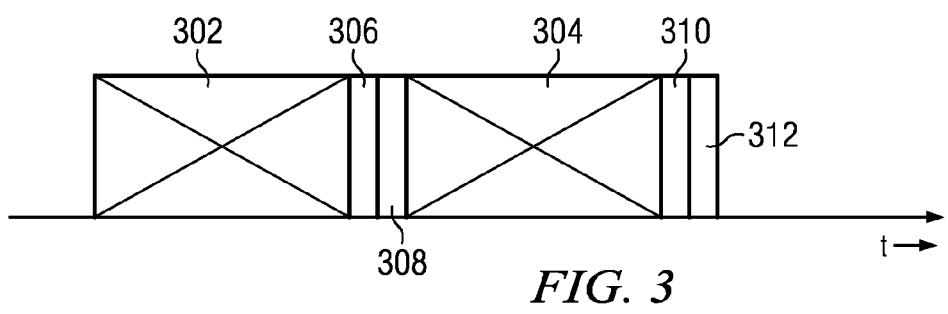
FIG. 3 is a timeline illustrating the display of two image fields and two pairs of flat fields.

FIG. 3 is a timeline illustrating the display of two image fields and two pairs of flat fields. During display period 302 a first image field is displayed. During display period 304 a second image field is displayed. Between the two image fields, a pair of flat fields is displayed as indicated by 306 and 308. Likewise after image field 304 is displayed, a second pair of flat fields is displayed as indicated by 310 and 312.

If a detector, such as a light sensor, is positioned to detect the intensity in a portion of the right half of the image plane, for example location 202 of FIG. 2A, the detector will register a minimal intensity during field 306 illustrated in FIG. 2A and a zero intensity during field 308 illustrated in FIG. 2B. As a result, it can be determined that the detector is pointing to the right half of the image.

It is possible, through a sequence of images to determine exactly where in the image the detector is pointing. One method determines whether the detector is pointed at a region of the image that is the first intensity or a region of the image that is the second intensity. A sequence of encoded images is displayed such that every location on the image has a unique code produced by the sequence. The pointer device detects the sequence to determine the location pointed to. The higher the desired location resolution, the more codes are required. Isolating the location to a very small region requires a detector that only "sees" a very small region of the image and a large number of frames. The large number of frames may allow viewers to detect the image sequence or unacceptably degrade the contrast of the image.

According to the present invention, the detector does not need to determine whether it is pointed at the on portion of the image or the off portion of the image, but rather measures the relative intensity received during the two flat field periods. Using the relative intensity instead of the absolute intensity of the two periods provides immunity to stray light and varying image intensity levels. When the measured intensity during the two fields that make up the flat field pair is equal, the detector is determined to be pointed at the seam between the two regions. When the measured intensity during the first of the two fields is greater than the measured intensity during the second of the two fields the detector is determined to be pointed at the region that is on during the first field.

FIGS. 2A through 2L illustrate a sequence of flat field pairs used to determine the exact location 202 pointed to by the detector. In FIG. 2A the left half of the image is turned off all the right half is turned on. In FIG. 2B the left half of the image is turned on and the right half of the image is turned off. After FIGS. 2A and 2B have been displayed by the display device and measured by the detector, it may be determined that the detector is pointed toward the right half of the image because the energy detected during the field in FIG. 2A is greater than the energy detected during the field displayed in FIG. 2B.

Figure 2C:
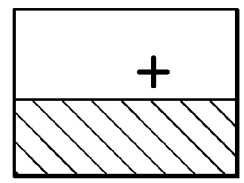
Figure 2D:
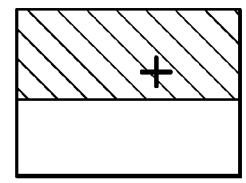

FIGS. 2C and 2D repeat the process, but with the screen divided in half along a horizontal line. In FIG. 2C the top half is turned on and the bottom half is turned off. In FIG. 2D the bottom half is turned on and the top half is turned off. After FIGS. 2C and 2D have been displayed by the display device and measured by the detector, it may be determined that the detector is pointed toward the upper half of the screen because the energy detected during the field displayed in FIG. 2C is greater than the energy detected during the field displayed during the FIG. 2D.

Figure 2E:
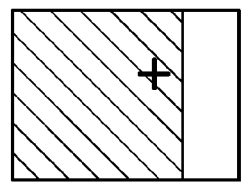
Figure 2F:
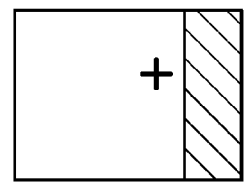

In FIGS. 2E and 2F, the right half of the field is divided into two portions. In FIG. 2E, only the right half of the right half, or the rightmost quarter, of the image is in the on state. In FIG. 2F the leftmost three quarters of the image is in the on state. Although it is known at this time that the detector is pointing to the right half of the image, the left half of the image is still illuminated half of the time in order that the combination of the two fields illustrated in FIGS. 2E and 2F is a flat field.

Figure 2G:
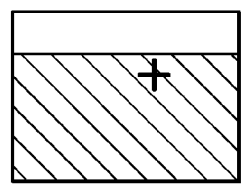
Figure 2H:
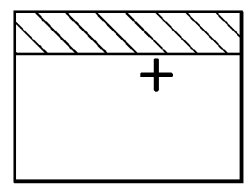

The detection process continues in FIGS. 2G and 2H. In FIG. 2G the upper quarter of the image is illuminated, or in the on state, during the first field. In FIG. 2H the lower three quarters of the image are illuminated. As a result of the flat fields illustrated in FIGS. 2G and 2H, the system can determine that the detector is pointing at the quarter of the screen just above the centerline and at the quarter of the screen just to the right of the centerline.

Figure 2I:
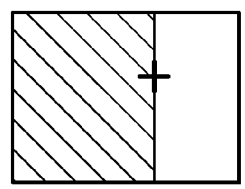
Figure 2J:
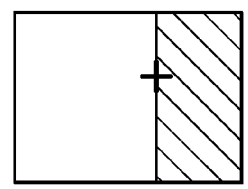
Figure 2K:
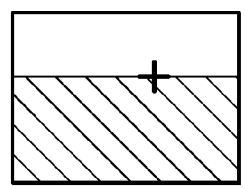
Figure 2L:
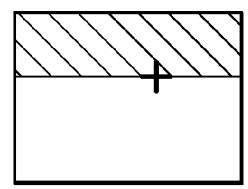

The process continues in FIGS. 2I and 2J with the quarter of the image at which the detector is pointed further divided into two regions along a vertical line, and in FIGS. 2K and 2L with a division along a horizontal line. By successively dividing the image and measuring the energy received during each field of the flat field pairs, the system eventually arrives at a point in which the on and off regions of each flat field image are divided through the point at which the detector is directed. When the division between the fields passes through the point at which the detector is directed, the energy received by the detector during the first and second fields that make up a flat field pair is equal and the system determines the location of the detector has been located.

Using flat field encoding to determine the position of the detector provides a great deal of immunity to ambient lighting and provides a reliable measurement method whether the detector is located close to the image plane or some distance from the image plane.

Once the location in the image at which the detector is pointing has been determined, it is no longer necessary to repeat the entire sequence of flat field pairs illustrated in FIGS. 2A through 2L. Instead, the system may just continue to utilize the flat fields having a seam dividing the two regions that runs through the expected point at which the detector is pointed.

While the foregoing description of the operation of the pointing system and method using flat fields provide one embodiment of the present invention, it should be understood that there are a great number of variations that fall within the true scope of the present invention. For example, the seam between the two regions of each of the flat fields in the pair does not need to be horizontal or vertical or even orthogonal to the seam of the corresponding field in the pair. While vertical and horizontal seams are generally easier to produce using the typical rasterized displays common in the field, curved and diagonal seams could be utilized with satisfactory results. The flat field patterns need not alternate between a vertical seam and a horizontal seam, but instead the system may project consecutive flat field pairs having the same seam orientation and may change the pattern between the flat fields of various orientations.

The system described thus far assumes that a flat field pair will be displayed between each image frame in a still or video image. Depending on the system and the requirements of the system to track a moving detector, the system may only display the flat field pair after some image frames rather than all image frames, or may display more than one pair of flat fields after each image frame. Some systems, especially sequential color systems or systems that utilize a digital display device, such as most micromirror devices, may generate multiple flat field pairs within the display period for a single image frame. For the purposes of this disclosure, it will be assumed that one flat field pair is generated for each image frame.

Likewise, the flat fields need not be comprised of an off state and an on state having a minimum intensity, but could utilize two on states of different intensities, or an off state and an on state of any intensity. Providing a minimal amount of light during the flat fields helps to keep the flat fields used to locate the position of the detector from deteriorating the projected image.

The circuitry necessary to implement the foregoing system may reside in the image source 110, the display device 108, the pointing device 102, or in a combination of all three. As will be described later, the detector may provide continuous information related to the intensity of the light detected, or it may sample the light at one or more points as a result of a trigger signal. If the detector provides a continuous reading, another component will sample the reading at the times appropriate for the images making up the flat field pair.

Likewise, the system may be implemented in hardware, software, or in a combination of hardware and software. Most systems are likely to include software running on a processor. The software implementing the system, or a portion thereof, may be installed onto a computer system such as electronic device 110 or it may be based partially or entirely within the display device 108. For the purposes of this disclosure, it will be assumed that the display device 108 includes the circuitry and software to implement the majority of the system and the display device determines the flat fields to display and triggers the detector to sample the intensity received during the flat fields.

Display device 108 may provide a variety of information to the display system in order to accomplish the location and tracking of the detector's position. To reduce the data that must be transferred between the detector and the displayed device, the detector may measure the received intensity during one or more of the null zones as well as the intensity of the light received during the first and second flat field periods. The intensity of the light received during the null zone includes any ambient light and is represented by $V_{DARK}$. The intensity of the light received during the first flat field period, or the first bit plane period, is represented by $V_{BP1}$. The intensity of the light received during the second flat field period, or the second bit plane period, is represented by $V_{/BP1}$. The detector may report all three values to the display system, or it may subtract $V_{DARK}$ from both $V_{BP1}$ and $V_{/BP1}$.

The display system generally receives the net intensity of the bit periods, the intensity of the bit periods after the intensity of the dark period has been subtracted, and calculates a relative intensity (RI) of the two pulses using the formula:

$$RI_{BP1}=(V_{BP1}-V_{DARK})/(V_{BP1}-V_{DARK}+V_{/BP1}-V_{DARK})$$

One embodiment of the present invention is amenable to implementation in micromirror-based display systems. Micromirror display systems are well known in the art, and reference is hereby made the large body of knowledge and documentation regarding the operation and design of such systems.

A typical micromirror based system uses a digital micromirror device (DMD) to create a sequence of images. The image of the micromirror array is focused on an image plane such that each micromirror in the array creates one pixel of the projected image. Because each mirror is operated in a digital manner in which the mirror is either "on" and directing incident light to the pixel on the image plane, or "off" and directing incident light away from the pixel on the image plane, the micromirror array can create only a small portion of the desired image at any given time. Because the DMD is a digital device, DMD-based systems utilize digital image data in which a series of data bits is used to describe the desired intensity for each pixel.

One method of creating a gray scale image using a DMD creates a series of images, each one comprised of the data for one bit of the image for each pixel. One bit of the image from each pixel is often referred to as a "bit plane." The intensity of the light and/or the duration of the image of each bit plane is controlled and coordinated to ensure that the perceived image, which is integrated from a series of bit-plane images by the human viewer's eye, is an accurate representation of the original image data.

Figure 4:
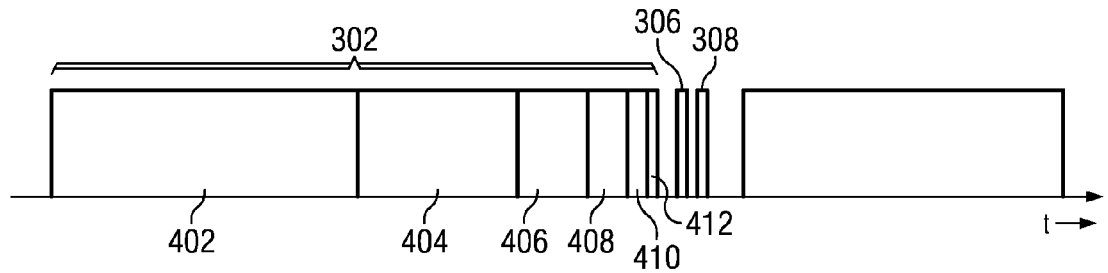
FIG. 4 is a timeline representing the creation of an image and a flat field pair by a digital display system.

FIG. 4 is a timeline representing the creation of an image and a flat field pair by a digital display system. The period in which the image is displayed in FIG. 4 roughly corresponds to image period 302 in FIG. 3. The periods for the display of the flat field pair, 306 and 308, of FIG. 3 are also shown in FIG. 4. In FIG. 4, a first bit-plane is displayed during period 402. Bit-plane 402 consumes a larger portion of the image period 302 and represents the most significant bit of the image. Additional bit-planes 404, 406, 408, 410 and 412 are used to display the remaining display bits. Each subsequent bit plane is illustrated as having half the duration of the previous bit plane so that binary data may be displayed.

While FIG. 4 shows one embodiment of a timeline for a digital display system, the timeline in FIG. 4 is much simpler than a timeline for a typical digital display system and therefore is for illustrative purposes only. A typical modern digital display system divides the larger bit periods into multiple smaller periods and disperses the smaller bit periods throughout the image period 302.

Additionally, typical modern digital display systems may not utilize binary weighting. Because of the intricacies involved in designing a bit display sequence, which relate to the load time of the device, the bandwidth of the load path, the minimum cycle period for a mirror of the device, some systems utilize bit weighting schemes that are designed to simplify the system. These systems may create a number of possible gray levels that exceeds the number of bit display periods. One method of creating more gray levels than the number of bit-planes used relies on a technique called spatial temporal multiplexing (STM).

STM uses one bit plane to produce a variety of gray levels by overlaying a duty cycle. For example, the desired gray scale for the STM bit plane may be represented by several bits, or by a floating point number. This desired value is compared to the value of the STM bit plane to determine the portion of the STM bit plane needed to create the desired gray scale. For example, the desired gray scale value may be 35% of the STM bit plane value. A random value between 0 and 1 is then generated for each pixel in the image and if the random value generated for a particular pixel is less than the desired proportion, in this case less than 0.35, the corresponding bit is turned on during the entire STM bit plane period. Over time and a number of image frames, the intensity of the pixel will approximate the desired value.

Returning to FIG. 4, the flat field pair is displayed during periods 306 and 308. While the flat field pair is illustrated as following the display of the entire image frame, it should be understood that one or more of the flat fields may be displayed during the creation of the image frame.

Figure 5:
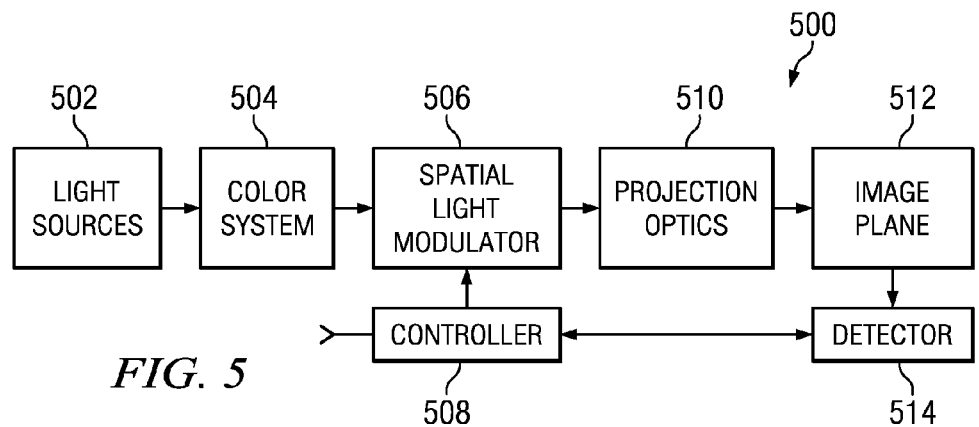
FIG. 5 is a schematic diagram of a single modulator display system using field sequential color to create a full-color image.

FIG. 5 is a schematic diagram of a single modulator display system 500 using field sequential color to create a full-color image. In FIG. 5, light source 502 generates a beam of light. The light travels color system 504 where it is time sequentially separated into three single color light beams. One example of a color system is a color wheel that spins to sequentially position a color filter in the light path traveled by the beam of light from light source. Each of the single color light beams impinges on spatial light modulator (SLM) 506. Controller 508 receives image data from external sources, or generates image data internally, for example on-screen-display (OSD) menus or other images. The image data, whether from an external or internal source, or a combination of external and internal sources, is converted into a format required by the display device. In the case of a DMD spatial light modulator the image data is converted into a series of bit-planes. Other spatial light modulators may require a data word or a voltage level to be driven to each display cell or display element.

Spatial light modulator 506 receives image data from controller 508. The bit planes from controller 508 are used by the spatial light modulator to spatially modulate the beam of light received from the color system. The image bearing beam of light, having been modulated by the spatial light modulator, travels to projection optics 510 which focus the image bearing beam of light on image plane 512. As described above, detector 514 measures the light energy received by the detector during the flat field pair. Controller 508 and detector 514 are in communication to coordinate the generation of the flat fields and the detection of the flat fields.

Figure 6:
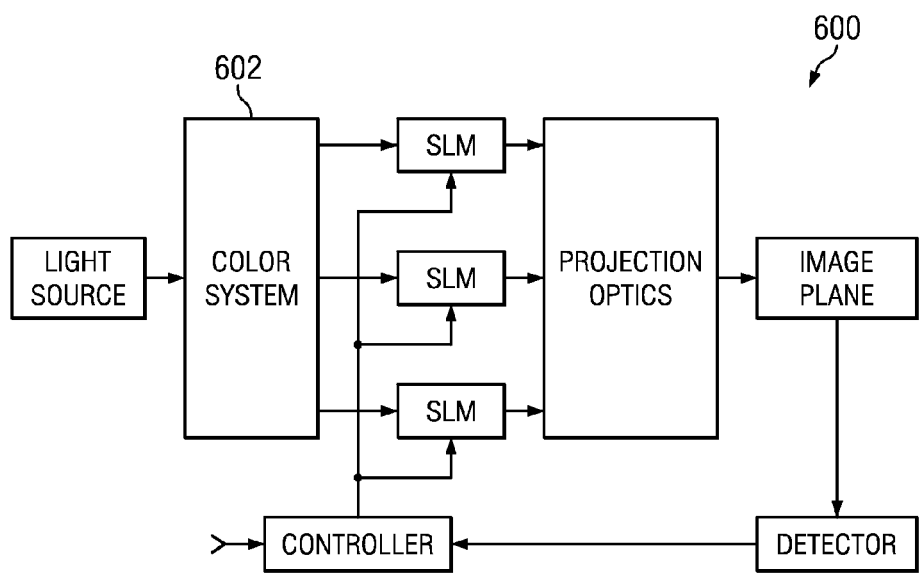
FIG. 6 is a schematic diagram of the display system using multiple spatial light modulators to generate a full-color image.

FIG. 6 is a schematic diagram of the display system 600 using multiple spatial light modulators to generate a full-color image. Display system 600 FIG. 6 is similar to display system 500. Color system 602 separates the light from the light source into three separate single color light beams. The three single color light beams each travel to separate spatial light modulators and are modulated using single color image data from the controller before being projected by projection optics onto the image plane. In the display system of FIG. 6 color system may be a color splitting prism or other color separation device. In the case of the color splitting prism, it is common for the modulated light from space light modulator to travel back through the color splitting prism to be combined into a single multicolor beam before passing through the projection optics.

Figure 7:
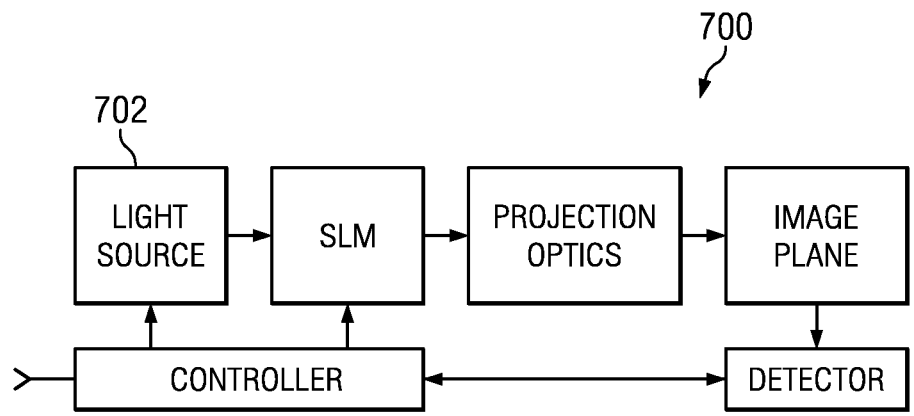
FIG. 7 is a schematic diagram of a display system using a controllable light source to create an image.

FIG. 7 is a schematic diagram of a display system 700 using a controllable light source 702 to create an image. Light source 702 is operable to generate a beam of light having multiple primary color components. For example light source 702 may comprise multiple lasers or light emitting diodes or multiple arrays of light emitting diodes each diode operable to independently create a beam of light having a single color. The multiple diodes may be enabled simultaneously to create a white beam of light, or may be enabled sequentially to create a beam of light whose color varies over time.

A controllable light source 702 may also be used to create very short flashes of light. These short flashes of light may be used to generate flat fields, especially in display systems in which the display device has a long reaction time. For example, the display device may be loaded with image data to create the first field of the flat field pair and the controllable light source flashed. The display device may then be loaded with image data to create the second field of the flat field pair and the controllable light source flashed a second time. This mode of operation, in which the controllable light source determines the duration of the flat fields, may be used in any display system and is not limited to use in display system 700 shown in FIG. 7. One benefit of using the controllable light source to create very short flat fields is that the total energy of the flat field pair is kept to a minimum.

Figure 8:
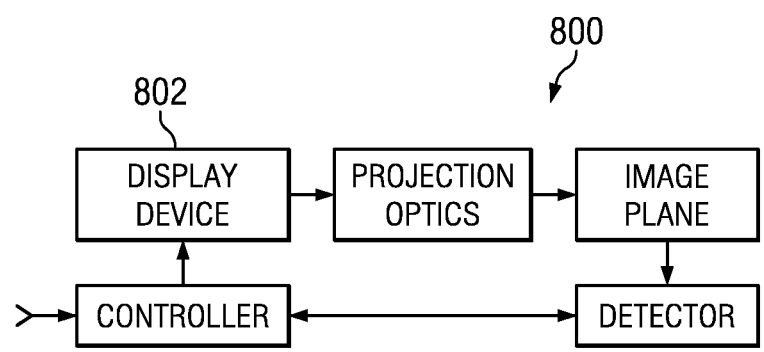
FIG. 8 is a schematic diagram of a display system using an array of self luminous display elements as the display device.

FIG. 8 is a schematic diagram of a display system 800 using an array of self luminous display elements as the display device 802. An example of a self luminous display is an organic light emitting diode array.

Figure 9:
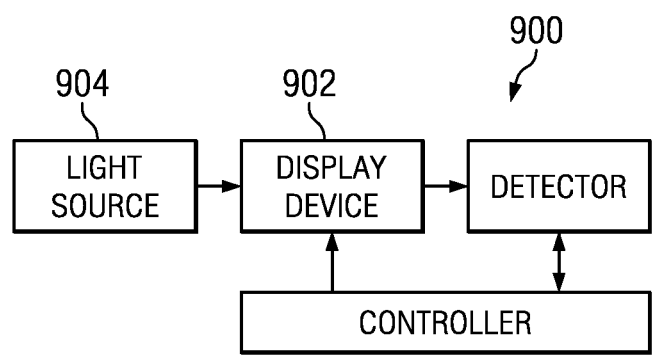
FIG. 9 is a schematic diagram of a display system using a direct view display device.

FIG. 9 is a schematic diagram of a display system 900 using a direct view display device. Examples of the display device 902 include LCD monitors, plasma displays, and similar display systems. Display system 900 may include a light source 904 such as backlighting systems commonly used with LCD monitors. Alternatively display device 902 may be self luminous. The image created by display device 902 is not projected onto an image plane but rather viewed directly.

While FIGS. 5 through 9 illustrate many of the common display systems currently in the market there are many permutations and combinations of the display systems that may be created. The example display systems given are merely for the purpose of illustration and are not intended to be limiting in any way.

A system according to the present invention must synchronize the display of the flat field pair and the detection of the flat field pair in order to provide valid data upon which to base the calculation of the detector location. This synchronization is affected by the manner in which the controller, detector, and display device communicate. For example, a high-bandwidth communication channel between the controller and detector allows continuous information regarding the state of the controller, the image data, and the detected energy to be shared.

Many desirable display systems, however, will not have a high-bandwidth communication channel between the detector and the controller. Instead, the system must rely on a relatively low bandwidth channel such as a Bluetooth interface, an infrared interface, or a low speed radio frequency or optical channel.

In systems in which there is not a high-bandwidth communication channel between the detector and the controller, it is advantageous for the detector to be able to synchronize with display of the flat fields and to automatically capture the detected energy level during the flat fields. When the detector is synchronizing itself to the controller's display of the flat field pairs it is important that the controller create flat field pairs at a consistent, repeatable rate rather than an adaptive rate based on needs of the image display or the motion of the detector.

Figure 10:
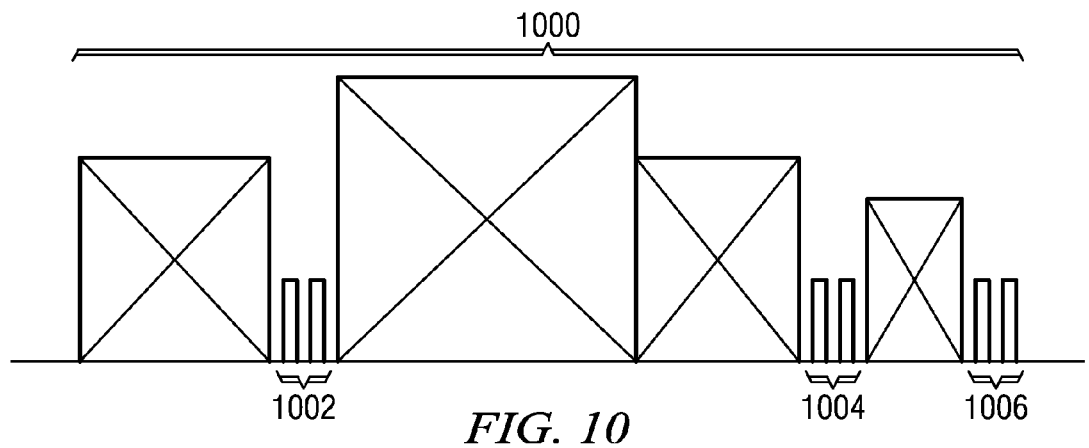
FIG. 10 is a timeline illustrating one frame period for field sequential color display device.

A consistent repeatable rate may include flat field display pairs that are not evenly distributed throughout frame. FIG. 10 is a timeline illustrating one frame period for field sequential color display device. Three flat field pairs 1002, 1004, 1006 are illustrated separated by four image display periods. The four image display periods may each represent separate colors, for example red, blue, green, white.

Figure 11:
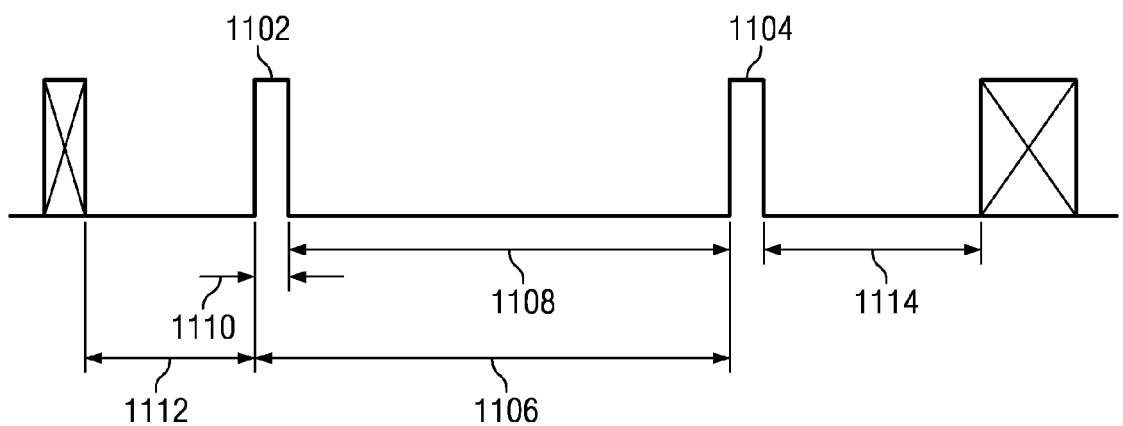
FIG. 11 is a timing diagram illustrating the timing of the flat fields and null zones.

To help the detector synchronize to the controller's display of the flat field pairs, the controller may generate the two flat fields at consistent repetition rate with the null zone before during and after the two fields. FIG. 11 is a timing diagram illustrating the timing of the flat fields 1102 and 1104 and the null zones. The leading edges of the flat fields at consistent timing relationship to each other. This timing relationship 1106 may be a relatively short period such as 100 μs. Each of the flat fields may be a shorter period 1110 for example 10 μs. As a result, there is a 90 μs null zone 1108. Additionally, there are leading and trailing null zones 1112 and 1114.

The detector may include circuitry to automatically look for and lock onto a predefined pattern such as that illustrated in FIGS. 10 and 11. A polyphase phased lock loop enables this. Alternatively, the controller may send a trigger signal to the detector during the leading null zone to cause the detector to trigger on the two flat fields. Yet another alternative is for the controller to send a trigger signal during each of the flat fields to cause the detector to sample the receipt intensity. Each of the foregoing alternatives has benefits and drawbacks. Standardization will simplify the design of the detector. Without standardization the detector may be required to detect and adapt to multiple standards.

FIG. 10 shows the location of the flat fields between color display periods. Other embodiments place the flat fields during the display of a single color or during the display of a broad spectrum color such as white. As long as the detector is able to detect the spectrum of light being displayed by the flat fields, any color may be used to generate the flat fields.

Depending on the display system, it may be advantageous to utilize a color display period in which the display system creates an overabundance of light. For example, if the light source of the display has a spectrum which is heavily weighted toward green placing the flat fields in the green display period will minimize the impact of the flat fields on the overall system brightness.

Alternatively, it may be advantageous to place the flat fields in a color display period in which the human eye is least sensitive. For example, blue flat field planes may be less detectable by human observer. Yet another alternative is to place the flat fields in a portion of the image display based on the color content of the image being displayed. For example, generating blue flat fields when the image being displayed is predominantly green may enable a brighter displayed image while keeping noticeable artifacts to a minimum.

Display systems which simultaneously produce all of the primary colors, such as LCD displays having interleaved colored pixels or three chip micro-mirror-based displays, generally must use all three colors to produce the flat fields. If the detector is provided with a color filter a single color may be used to create the flat fields even in a simultaneous color display system. For example, if the detector is provided with a color filter which allows only the blue light to pass through it, the flat fields may be produced by the blue channel while the red and green channels continue producing the image.

The flat fields could be generated using a non-visible light source such as an infrared diode. While this would require an extra component compared to the display systems previously discussed, the use of an infrared diode would make the flat fields undetectable by human viewers and prevent degradation of the displayed image.

Figure 12:
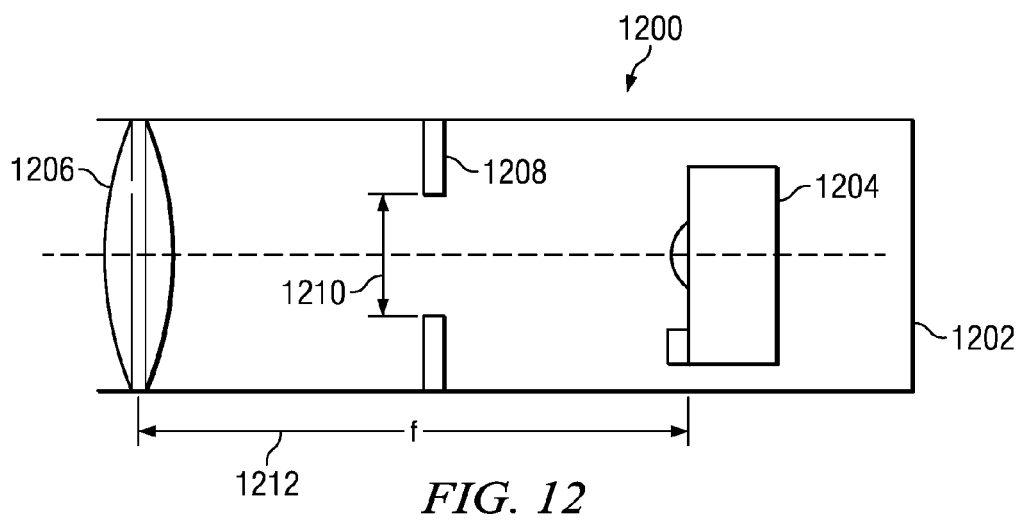
FIG. 12 is a schematic view of a handheld detector.

FIG. 12 is a schematic view of a handheld detector 1200. Detector 1200 includes a housing 1202 which contains a sensor 1204. Sensor 1204 is typically a photodiode but may be other types of sensors such as cadmium sulfide cells. An optional lens 1206 is located near the opening of the housing to receive light from the image plane and focus the light on the sensor 1204. While lens 1206 is shown as a single optical element, it is understood that lens 1206 may be comprised of multiple lens elements. As shown in FIG. 12 lens has a focal length 1212. Detector 1200 may include additional optical components such as optical stop 1208 which defines aperture 1210. FIG. 12 does not illustrate additional electronic components that are necessary to detect and extract the flat fields.

Figure 13:
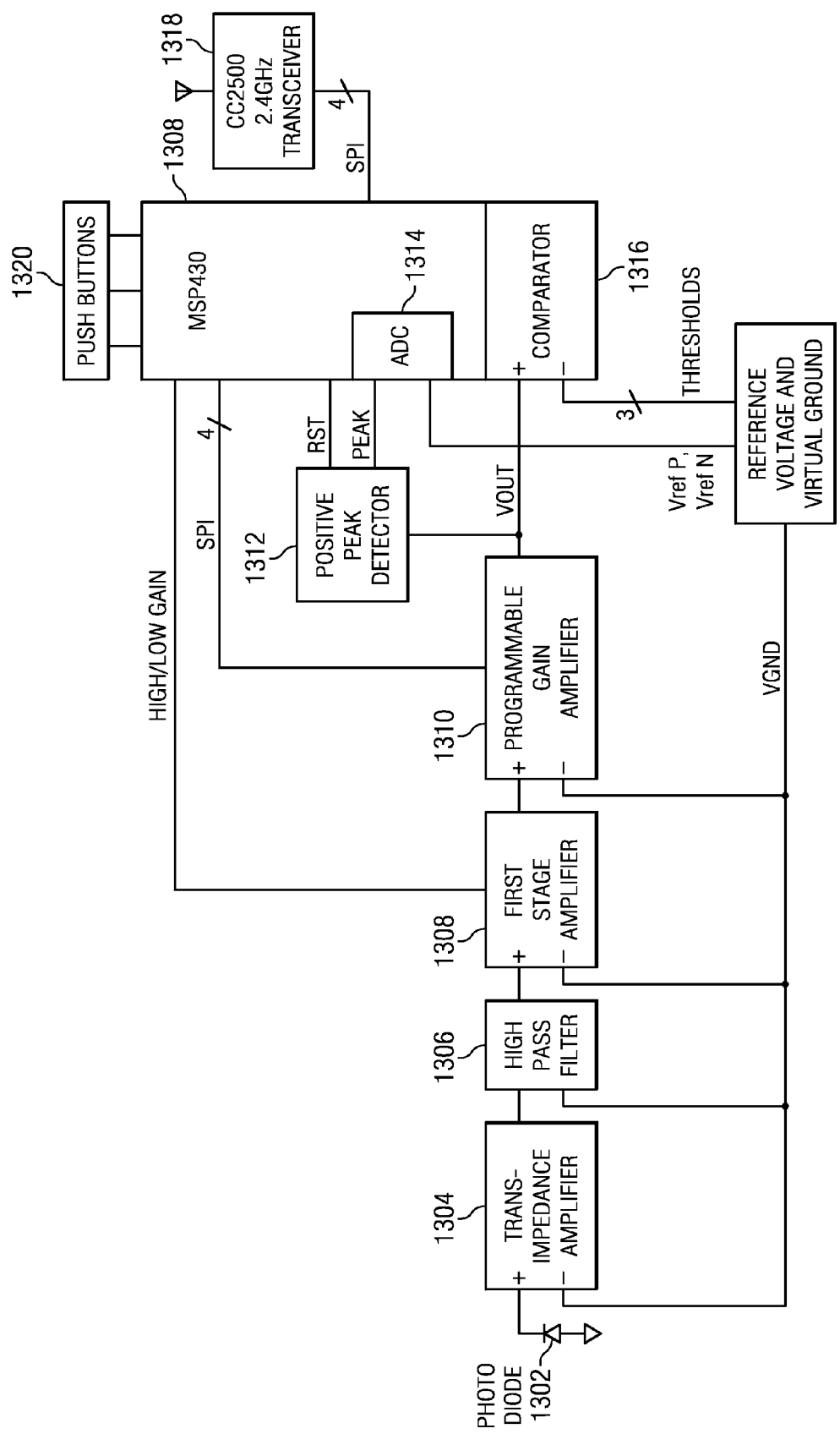
FIG. 13 is a schematic view of the electrical components used to extract the pulse information from a typical handheld detector.

FIG. 13 is a schematic view of the electrical components used to extract the pulse information from a typical handheld detector. Photodiode 1302 receives light from the image plane and produces an electrical current. Transimpedance amplifier 1304 converts the electrical current into a voltage signal. High pass filter 1306 smoothes in output from the transimpedance amplifier 1304. Amplifiers 1308 and 1310 add gain and voltage offset to the filtered voltage signal. Microprocessor 1308 controls amplifiers 1308 and 1310 to ensure that the output from the amplifiers is within a desired range and the gain from the operational amplifier is sufficient to adequately amplify the voltage signal.

The output of amplifier 1310 drives positive peak detector 1312. Analog to digital converter 1314 periodically captures the output of the peak detector 1312 under the control of the microprocessor 1308. In operation, the peak detector is used to effectively stretch the pulse generated by each of the flat fields and to ensure the analog to digital converter samples the peak intensity of each pulse.

The output of amplifier 1310 is also input to a comparator 1316 which is part of the microcontroller 1308. The comparator compares the filtered pulse signal to a reference threshold. When the signal exceeds the threshold, the capture timer circuit of the microprocessor is triggered. The capture timer circuit operates to confirm a pulse was received by the microprocessor.

Microprocessor 1308 also controls the operation of push buttons 1320 or other user input mechanisms, and transfers data to and from the RF transceiver 1318 to enable communications with a controller typically located in the display device.

Synchronization between the display device and the detector may be started automatically when the display device detects the presence of a detector by the use of a radio frequency or other communications link. Alternatively, the user of the display device may configure the display to always send synchronization signals to detectors that may be located in the immediate area, or the user of the display device may send a command to the display device to begin sending the synchronization signal.

To reduce the processing needed by the detector device and to increase the speed at which the synchronization is achieved, the synchronization process typically is started by the display device sending data describing the timeline to the detector device using the RF link. For example, the data may describe the frame period, the number of flat field periods in each frame, the duration of the flat field periods, the duration of the null periods before, between, and after the flat field periods, and the location of the flat field periods within the frame.

To further assist the synchronization between the display device and the detector, the display device may produce flat fields specially designed to aid in the synchronization. For example, rather than have a seam in each of the flat fields that separates an off region from an on region, each of the flat fields may contain a uniform field of on and off pixels arranged in a checkerboard pattern. Since the detector does not resolve each pixel of the displayed image, upon exposure to this synchronization field the detector will produce two pulses, each representing one of the flat fields. Each of the pulses will have a magnitude approximately equal to half the magnitude of a pulse generated by a field of on pixels. The microprocessor 1308 in FIG. 13 can adjust the gain and offset of the operation amplifier to center the magnitude in the range desired. The detector circuit can lock onto the synchronization flat fields using a poly-phase phase locked loop.

As mentioned above, the processing to control the system may be embedded in either the projector, the detector, or in another system component. For the purposes of illustration it will be assumed that the processing and control circuitry and software reside in the display device.

The detector typically returns the detected value of the two pulses to the display system. When the display device receives the two pulse values from the detector over the RF link, or other communications channel, it can determine that the detector is properly synchronized and begin producing flat field pairs to locate the portion of the image at which the detector is pointed.

As the detector is a mobile device and relies on communications with the display device via an RF channel, the detector is susceptible to losing synchronization with the display device. There are several ways in which synchronization may be maintained during the operation of the device. First, the detector may signal to the display device when the detector detects the synchronization is lost. After receiving communications that synchronization has been lost, the display device can begin generating the synchronization fields to reestablish synchronization.

Alternatively, if the display device fails to receive periodic signals from the detector indicating the sizes of the received pulses, the display device may assume that the synchronization is lost and begin generating the synchronization fields to reestablish synchronization.

Another method of reestablishing or maintaining synchronization between the display device and the detector is to periodically generate the synchronization fields. For example, the display device may generate a sequence of synchronization fields every few seconds to reestablish the synchronization, or generate one or more synchronization fields after every few flat fields.

Figure 14:
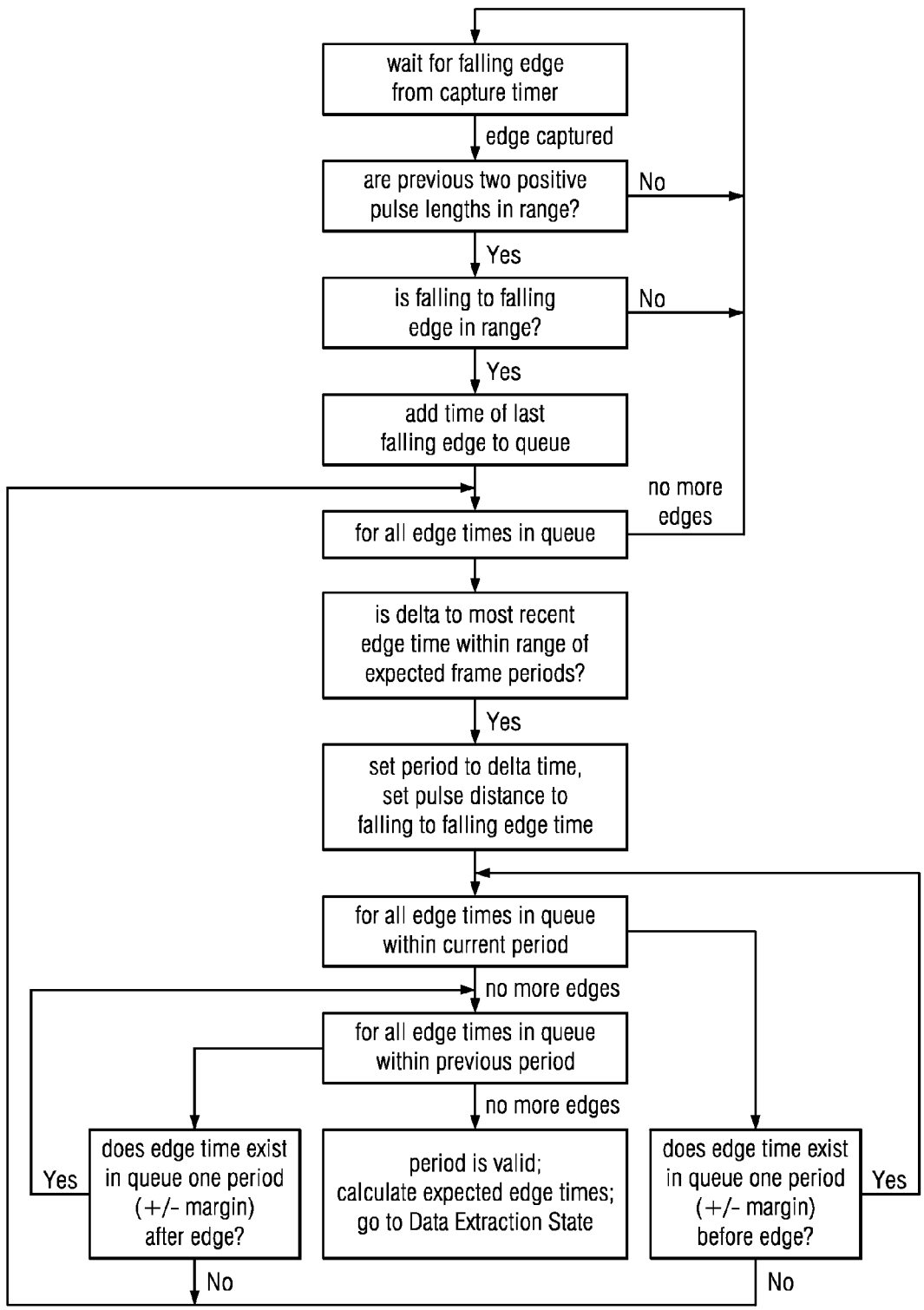
FIG. 14 is a flow chart illustrating the process of tracking the pulses representing the flat field periods and verifying the pulses have the proper timing relationship to ensure the detector is synchronized with the display system.
Figure 15:
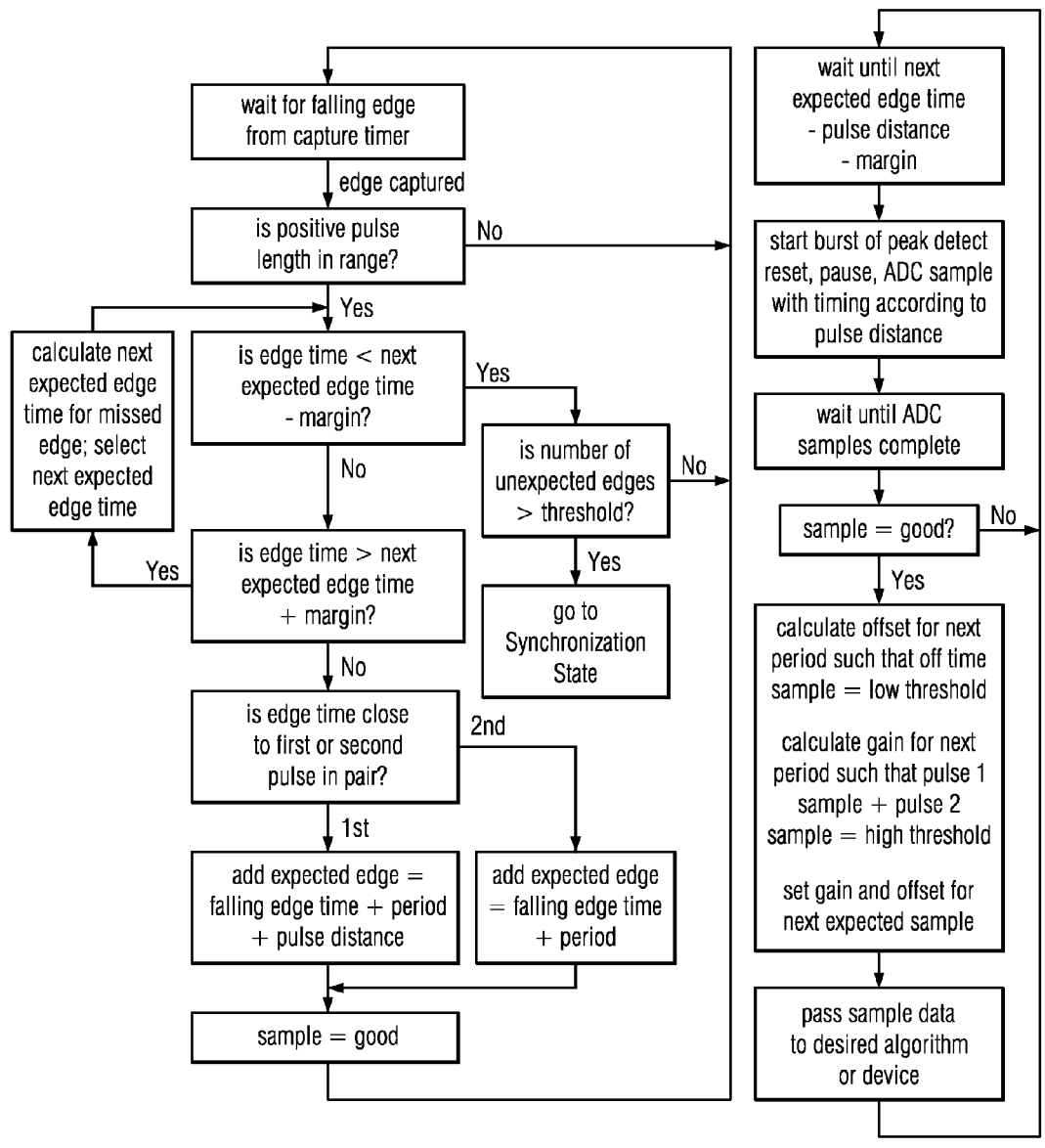
FIG. 15 is a flow chart illustrating the process of tracking the pulses representing the flat field periods and verifying the pulses have the proper timing relationship to ensure the detector is synchronized with the display system.
Figure 16:
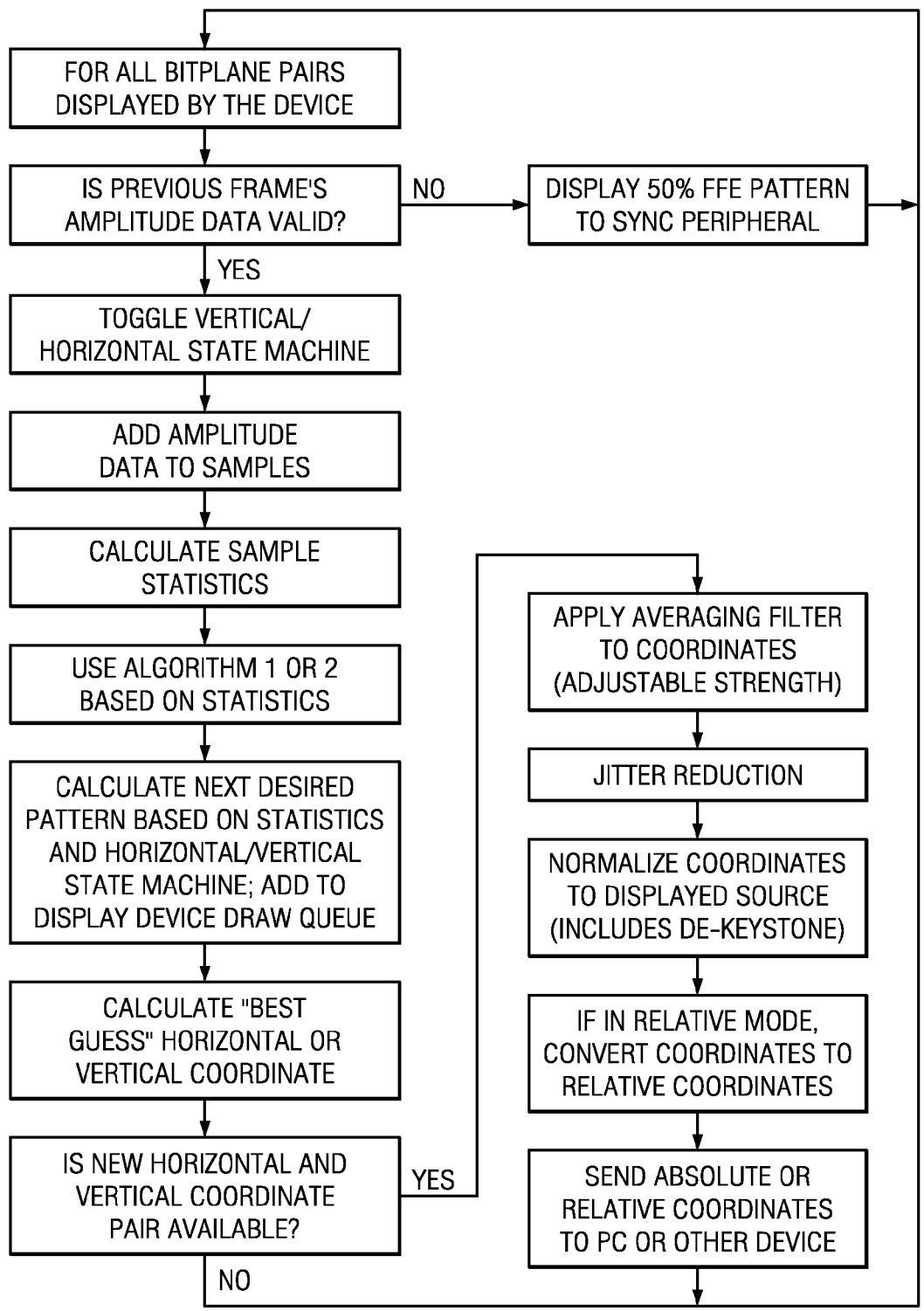
FIG. 16 is a block diagram of a process to extract the data from the flat fields.

FIGS. 14 and 15 provide flow charts illustrating methods of tracking the pulses representing the flat field periods and verifying the pulses have the proper timing relationship to ensure the detector is synchronized with the display system. FIG. 16 is a block diagram of a process to extract the data from the flat fields.

Code to track the location of the detector is provided below. The same code may be used to track the vertical position and the horizontal position of the detector.

```
initialize min/max bounds to min/max display
initialize offset to x pixels (e.g. 4)
display boundary FFE pattern with pattern boundary = middle of the display
LOOP START
wait for valid pulse amplitude data: (pulse1 − off + pulse2 − off) > threshold
calculate relative intensity ratio = (pulse1 − off)/(pulse1 − off + pulse2 − off)
if ratio < 50%
    if max bound − min bound < threshold (e.g. 4)
        max bound = max display
    min bound = pattern boundary
    if previous FFE ratio > 50%
        offset = offset * 2
    else
        offset = offset / 2
    limit minimum offset to 1
    if pattern boundary + offset > max bound
        pattern boundary = (pattern boundary + max bound)/2
    else
        pattern boundary = pattern boundary + offset
else
    if max bound − min bound < threshold (e.g. 4)
        min bound = min display
    max bound = pattern boundary
    if previous ratio > 50%
        offset = offset * 2
    else
        offset = offset / 2
    limit minimum offset to 1
    if pattern boundary − offset < min bound
```

```
        pattern boundary = (pattern boundary + min bound)/2
    else
        pattern boundary = pattern boundary + offset
add boundary FFE pattern to display device draw queue
if previous best guess coordinate is less than min bound
    best guess coordinate = min bound
else if previous best guess coordinate is greater than max bound
    best guess coordinate = max bound
else
    best guess coordinate = previous best guess coordinate
goto LOOP START to wait for next result
```

While the foregoing description describes the images used to track the location of the detector on the image plane as flat fields, it should be understood that the term flat fields need not be strictly interpreted. Ideally the summation of a flat field pair will be perceived as having no visible or perceptible boundaries or artifacts. Given the viewer's limited ability to perceive minor artifacts, however, the inclusion of a number of pixels that are on or off in both of the fields making up a flat field pair will result in the sum of the two fields having an intensity that, while not uniform, is so close to a uniform intensity that the differences cannot be detected, or are not objectionable, to the human viewer. The use of such fields, however, should still be considered within the scope of the present invention.

Most projection display devices and devices relying on a backlight to illuminate a display panel are known to exhibit a high degree of brightness roll-off towards the edges of the image. For example, when displaying a maximum brightness white image, the luminance at the center of the screen typically is greater than the luminance at the edges of the screen. Many display manufacturers attempt to reduce this artifact, but obtaining a perfectly flat image can be expensive. Since human viewers are more price sensitive than they are sensitive to the roll-off artifact, it is not uncommon for commercially available display devices to exhibit a roll-off of 50% from the center to the edge of the image. Given the roll-off effect, there are many opportunities to produce field pairs that are not perfectly flat but still enable the operation of the present invention with little objection from the image viewer.

While the flat fields described herein have generally been referred to as comprising a first region in which all of the pixels are in an on state—that is emitting or transmitting light—and a second region in which all of the pixels are in an off state—that is emitting or transmitting no light—it should be understood that alternatives to these states may be utilized without departing from the teachings of this disclosure.

For example, the fields may comprise regions in which not all of the pixels are in the same state. For example, the pixels in a first or second region may be in a checkerboard or other pattern in which a first portion of the pixels are in an on state and another portion of the pixels are in an off state. For example, in the first region 25% of the pixels may be in the on state and in the second region 75% of the pixels may be in the on state. The sum of the two fields would still be equivalent to a flat field having 50% of the pixels in the on state.

Provided there is sufficient energy created by a field when not all of the pixels in a region are in the on state, checkerboard or other patterns could be useful to reduce the total energy directed to the image plane during the tracking process. For example, if one region has 100% of the pixels in the off state and the other region has 50% of the pixels in the on state, half as much energy is directed to the image plane compared to a second region having 100% of the pixels in the on state. As a result, there is less contrast degradation in the image being displayed.

If the fields include checkerboard or other dither patterns, the patterns ideally are shifted periodically so that the patterns will not be detectable to a human viewer. Additionally, the patterns should be selected so that the location of the pattern relative to the detector's field of view will not affect the operation of the detector.

In addition to locating the center of the field of view of the detector, the display system may also measure the size of the field of view of the detector by intentionally offsetting the seam in the flat fields relative to the expected center of the field of view. Determining the size of the field of view is useful for several functions, including edge compensation and filtering the detected center of the field of view.

For example, the further the detector is from the image plane, the larger the field of view will be and the harder it will be for a user to steadily point the detector at the desired point in the image. As a result, the display system may filter the location data to prevent the cursor from jumping around as much. Likewise, the distance between the user and the screen affects the speed at which the detector is likely to move across the image. As a result, the display device may use adjust the seams of the flat field pairs at a different rate when the user is further from the image plane than when the user is closer to the image plane.

Several methods may be used to smooth the motion of the cursor or other object and to reduce jitter. An averaging filter may be used. The averaging filter may have a variable size to allow it to adapt to user preferences or circumstances. The location of the cursor may be paused after a button is pushed. This pause can avoid unnecessary cursor motion and also contributes to the ability of the user to "double click" various objects. Dynamic coordinate mapping may also be used to decelerate the cursor when the cursor is near an area of interest such as a menu button or at a point around which the cursor has been lingering.

Some embodiments of the present invention include the use of two or more sensors. The sensors may be independently directed toward the image plane or they may be located in a common housing that holds their relative position constant.

Whether the sensors are independently directed toward the image plane or located in a common housing, the display system may separately track them as a multi-point pattern—similar to a multi-touch screen—or it may sum the responses and determine a central point for the orientation of the multiple sensors. When the sensors are located in a common housing, the relative positions of the fields of view of the sensors provides information on the attitude of the detector—for example the pitch, roll, and yaw of the detector—in addition to the location to which the detector is pointed.

When multiple sensors are used, the display system does not necessarily monitor all of the sensors at the same rate. For example, the position of a primary sensor may be updated on a frame by frame basis while the position of a secondary sensor may be updated every few frames to determine the attitude of the detector.

Instead of using multiple sensors to determine the attitude of the detector, a charge couple device (CCD) array may be used instead of the sensors to capture multiple images of the flat fields. Image from the CCD array can be examined to determine the attitude of the array relative to the seams of the flat fields and data from multiple pixels of the array may be used in place of the data from multiple sensors as described above.

As the detector is pointed towards regions of the image near the edge of the image, a portion of the field of view of the detector extends beyond the edge of the image. Since there are no image pixels corresponding to the region beyond the image, a flat field whose seam is centered on the center of the field of view of the detector will not return two equal pulse values when a portion of the detector's field of view is located outside the image. For example, when the center of the detector's field of view corresponds to the right edge of the image, a flat field pair whose seam is the right edge of the image will generate a pulse during the field in which the image region to the left of the seam is on, an no pulse during the field in which the image region to the right of the seam is on—since no pixels are actually on. The pulse from the field in which the image region to the left of the seam will be half the magnitude of a pulse that would be generated if the full field of view of the detector was directed to an on region of the image.

One method of compensating for the edge of the image is to just accept the fact that one of the pulses will gradually disappear as the detector is pointed closer and closer to the edge of the image. As the center of the detector field of view is tracked and approaches the edge of the screen, the display device can anticipate that one of the pulses will gradually diminish. Losing the pulse entirely, however, may compromise the ability of the detector to remain in synchronization with the display device.

Another method of compensating for the limitations caused when a portion of the field of view of the detector extends beyond the image is to reduce the need for the detector to be pointed near the edge. This can be accomplished by providing feedback to the user that causes the user to believe the detector is pointed closer to the edge of the image than it actually is. For example, a cursor may be generated as part of the displayed image to indicate the point at which the detector is pointed. When the detector is pointed at the center of the screen, the display device locates the cursor in the center of the screen. As the user moves the detector toward the right edge of the screen, the display device may move the cursor toward the right edge of the screen at a rate that exceeds the movement of the detector. The rate of movement maybe calculated to result in the cursor being positioned on the edge of the image when the leading edge of the detector's field of view first reaches the right edge of the image. This method of adjustment ensures that both of the fields in the flat field pair are not only detected, but detected at their full intensity.

Yet another method places the cursor at the center of the detector's field of view until an edge of the detector's field of view begins to leave the image region. At this point, the seam between the two regions in the flat field is located a distance from the edge of the image equal to one half of the distance across the detector's field of view and the signals detected for each of the fields in the flat field pair are equal. At this point, the seam is not moved closer to the edge, but the cursor is moved closer to the edge as the display device senses the movement of the detector towards the edge as indicated by the relative strength of the signal representing each of the field in the flat field pair. This method ensures the cursor is always located in the center of the detector's field of view, but does not provide as strong of signals as the previous method.

While the foregoing description has been directed to the identification of the exact point at which the detector is pointing, some applications of the present invention do not require that accuracy. As mentioned above, one function of the detector is to function as a hand-held input device for either the display system or other devices in the system. For example, the detector may be used in place of a computer mouse to navigate through various menus, enter data, and control the operation of equipment or software.

Likewise, the detector may be used as a hand-held input device to configure the display device through the use of an on screen menu. When the component generating the flat fields is aware of such a menu structure, the seams of the flat field pairs may be selected to enable the system to quickly determine which menu button or input region is being viewed by the detector. For example, the center of the detector's field of view may be assumed to be a menu button or field, and when it is determined that the seam between the regions of the flat field pair does not cross through the field of view, the seams may be shifted to another menu region indicated by the relative magnitudes of the flat fields.

In some cases, it will be necessary for the detection system to communicate with a device other than the display device. For example, when a computer video output is used to provide image signals to an image projector, there may not be an established channel for the image projector to communicate the position of the detector. Once solution is to establish a communications channel with the computer and convey information about the detector position and any commands received from the detector to the computer. One communications channel could be a Bluetooth channel between the projector and the computer—or between the detector and the computer, at least in situations in which the detector includes circuitry and/or software to enable it to know its position relative to the image.

Another communications channel could be an infrared channel between devices. Yet another communications channel uses an RF channel to enable the display device to send signals to a receiver plugged into a universal serial bus (USB) port on the computer. The USB stick approach could rely on the same types of commands and information currently relied upon by to establish communications between a wireless computer mouse and a computer.

The detector device taught herein has many uses. Several of those uses are as replacements for devices existing today, such as pen pointing devices, gun pointing devices, glove pointing devices, head tracking and pointing devices, and mouse-like devices. In these embodiment, it will be useful to include multiple input mechanisms on each device. For example, left, center, right, forward, and backward mouse buttons, scroll wheels, pressure sensitive buttons, pressure sensitive tips for detecting contact with other objects, mechanisms to enable and disable tracking or control the responsiveness of the tracking, power on/off controls, synchronization controls, signal strength, device status, and power LEDs, focusing mechanisms, switches to alternate between absolute and relative coordinates, triggers, force feedback mechanisms, momentary switches, momentary switches operated by curling one or more fingers, structures to allow the device to be affixed to the head, hand, or other body parts.

The method and system taught herein may also be used to assist in the set up of a display projector. My pointing the detector at the image corners, or at the desired location of the image corner, the display system can automatically correct keystoning, image offset, and determine the proper zoom. Likewise, the method and system may be used for multipoint detection and robot tracking.

The method and system taught above are also useful to provide control signals to operate peripherals. Data can be encoded in the video signal to initiate ambient effects or synchronize such effects to the display of the image. Effects include: room light control, color globes, flashes of light, fan control. Alternatively, the encoded data may be used to control 3D shutter glasses. To control peripherals, the peripheral will have a sensor and electronics to extract the signal from the image stream. FIG. 17 is a block diagram illustrating one method of controlling peripherals according to the present invention.

FIG. 19 is a schematic view of a controller 508. The horizontal and vertical state machines are initialized to a given state. The patterns output from the state machine are determined by the state of the state machine. Each state machine outputs patterns for multiple time steps. Logic may select one pattern alternately from the horizontal and vertical state machines to load on the display device. If an update has been made to the selected state machine since the last pattern was displayed, the pattern for time K+1 is selected. If no update has been made since to the state machine since the pattern K+1 was displayed, the pattern for time K+2 is selected, and so on. When a pattern is loaded on the display device, the description of the pattern is stored in a pattern history queue. When the detector inputs a pulse pair measurement to the device, the sample time is input to the pattern history queue to determine what pattern was displayed at the time of the pulse pair measurement. The pulse pair measurement, sample time, and pattern description are then input to either the horizontal state machine if the pattern was horizontal, or the vertical state machine if the pattern was vertical. The state machines update the output for the next patterns and also output the best guess position and width of the detector's field of view. The x and y position, width and height are input to a smoothing filter before being output to other electronics.

It will be appreciated by those skilled in the art that a new and useful system and method of detecting the position and orientation of a detector has been described herein. In view of the many possible embodiments, however, it should be recognized that the embodiments described herein with respect to the drawing figures are meant to be illustrative only and should not be taken as limiting the scope of what is claimed. Those of skill in the art will recognize that the illustrated embodiments can be modified in arrangement and detail. Therefore, the devices and methods as described herein contemplate all such embodiments as may come within the scope of the following claims and equivalents thereof.

What is claimed is:

1. A method of locating a point in a projected image, comprising:
   displaying an image onto a display surface in response to a stream of image data received from an image data source; frames of the image being displayed as composites of image data fields sequentially displayed during a frame imaging time;
   displaying control information onto the display surface together with the image data from the image stream using a flat field encoding scheme, whereby control data is imaged differently at different locations in the sequentially displayed fields and the different imaging at the different locations sums to image a uniform intensity and color in the composite frame image;
   pointing a detector at a selected location in the displayed image and detecting a succession of intensities of the control data displayed at the selected location for the respective sequentially displayed fields, the different imaging of the control data displayed in later displayed ones of the sequentially displayed fields being determined by the intensities of the control data detected in earlier ones of the sequentially displayed fields; and
   determining the selected location from the detected succession of intensities.

2. The method of claim 1, whereby during a first time in a frame imaging time the control information displays first intensity values at pixels in a first region and second intensity values at pixels in a second region of a displayed first image data field, and during a second time in the same frame imaging time the control information displays the second intensity values at pixels in the first region and the first intensity values at pixels in the second region, whereby the sum of the first and second intensity values produces a same uniform intensity and color value for the control information displayed at all the pixels in both the first and second regions.

3. The method of claim 1, wherein the sequentially displayed image data fields are bit plane representations of the image data received in the image data stream; and the image is displayed by modulating modulators of a spatial light modulator using the bit plane representations.

4. The method of claim 3, wherein the control data is encoded with the data from the image data stream at a projector that includes the spatial light modulator, and the detector is a hand-held pointer.

5. The method of claim 4, wherein the intensities detected by the pointer are transmitted to the projector.

* * * * *